Aug. 2, 1938.  J. L. KNIGHT ET AL  2,125,574
SEPARATING MEANS
Filed April 23, 1936   3 Sheets-Sheet 1
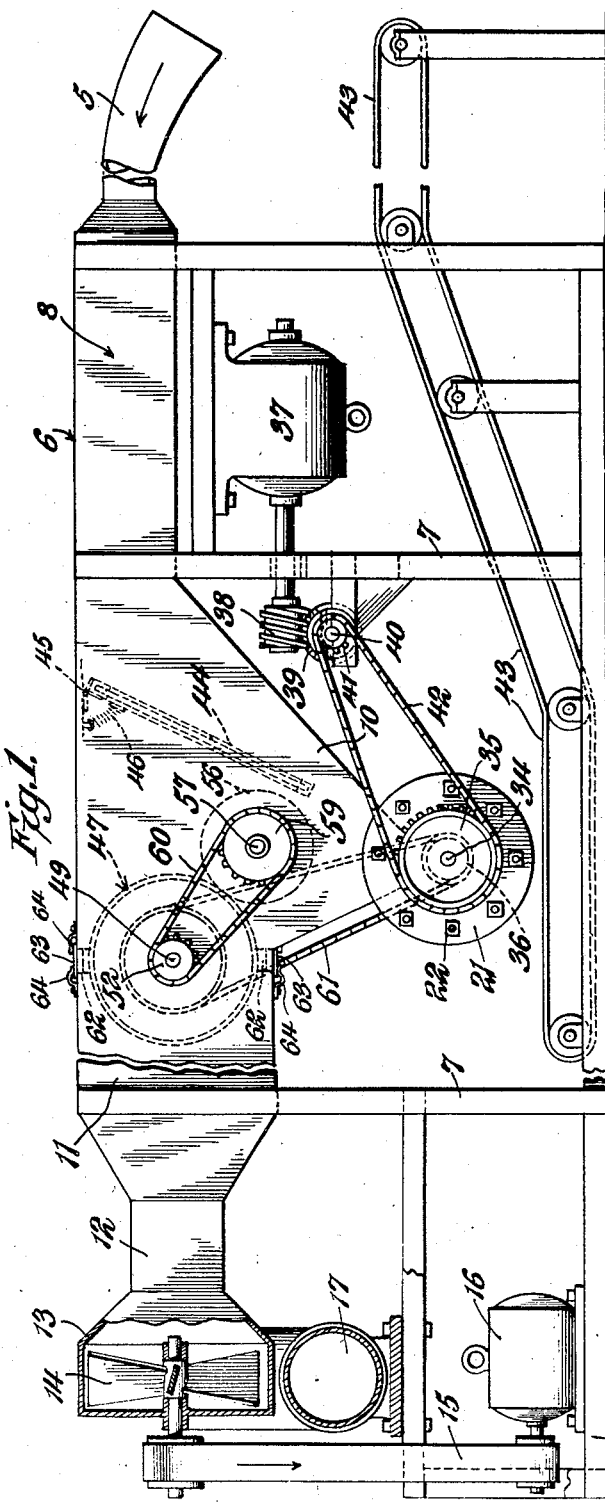
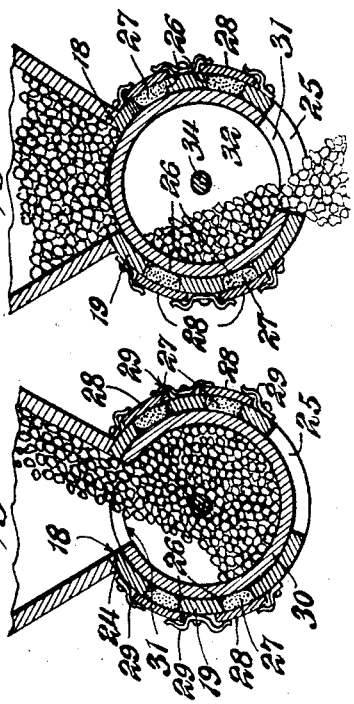
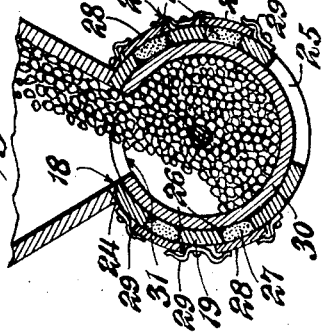
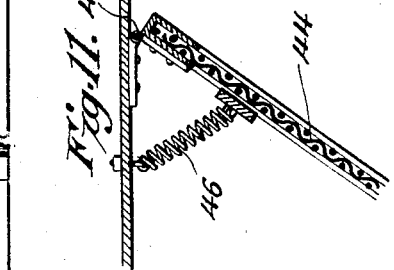
Inventor
Jesse L. Knight,
and Charles R. Stahl.
Attorney

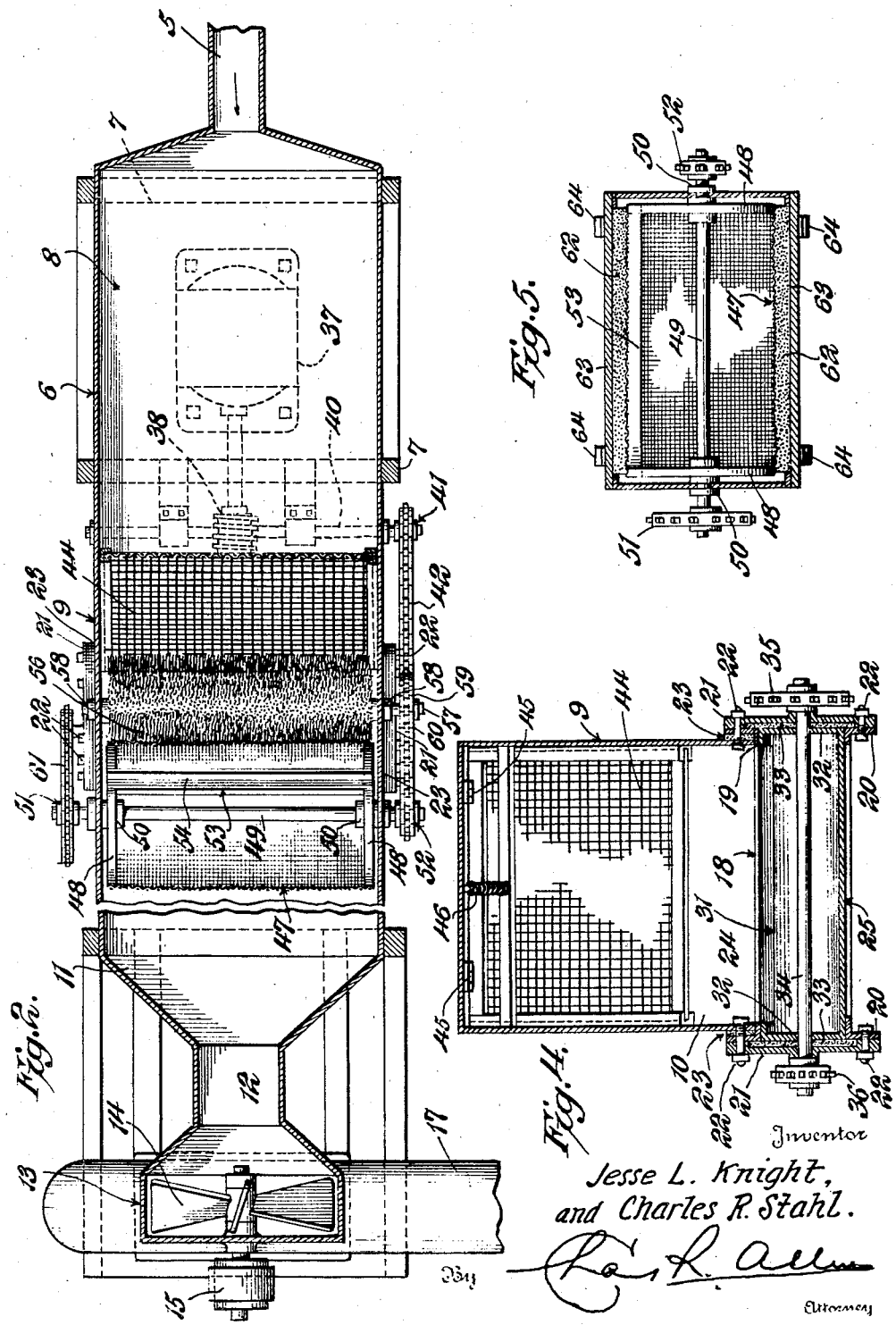

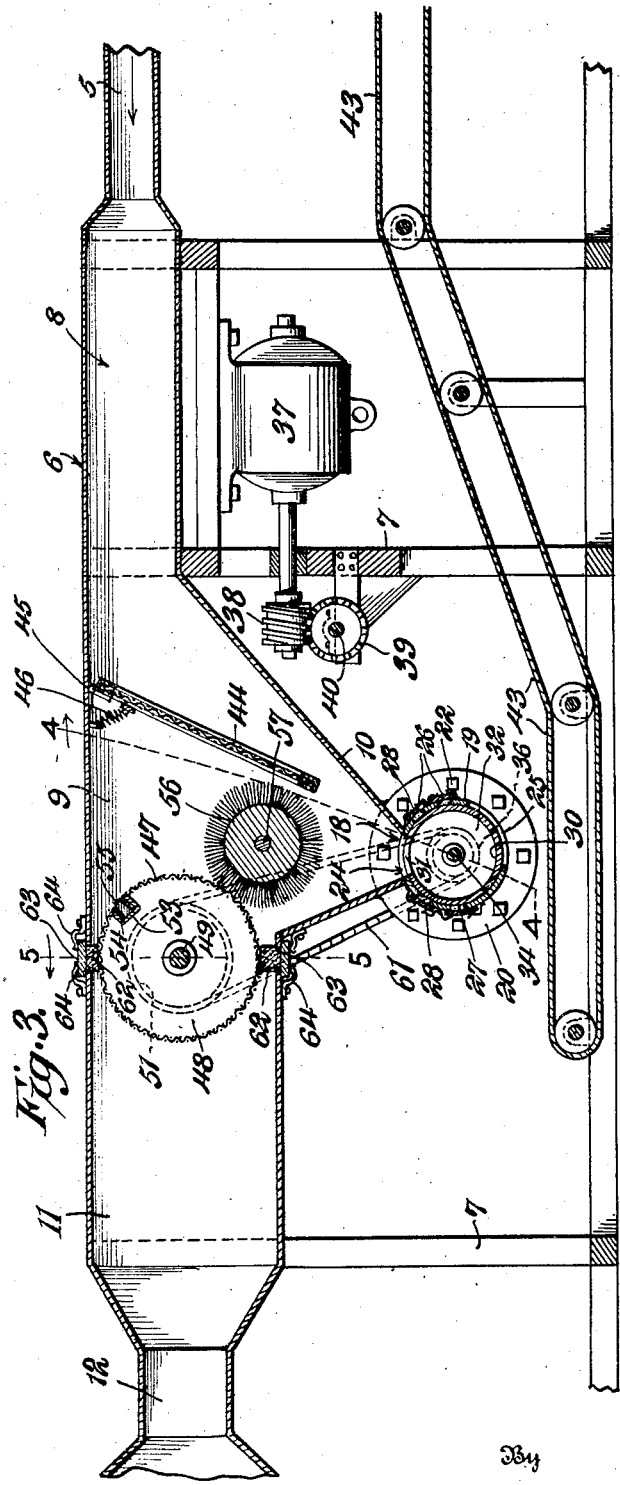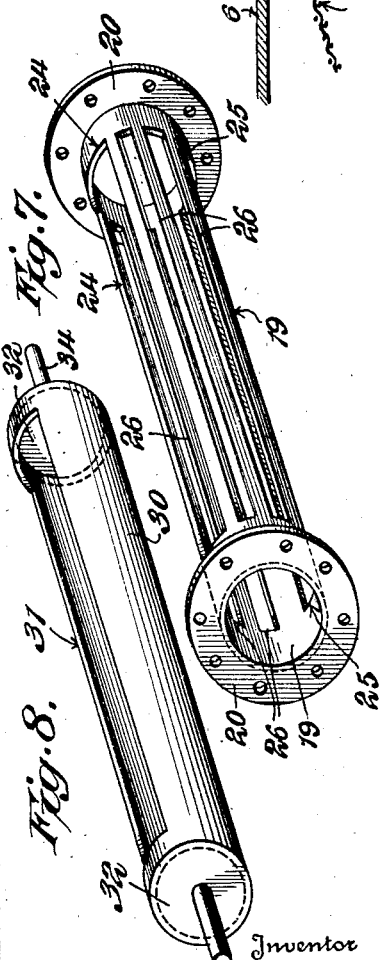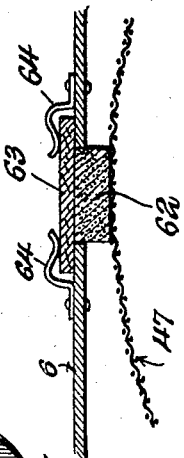

Patented Aug. 2, 1938

2,125,574

UNITED STATES PATENT OFFICE 2,125,574

SEPARATING MEANS

Jesse L. Knight, Montgomery, and Charles R. Stahl, Kimberly, W. Va.

Application April 23, 1936, Serial No. 76,032

2 Claims. (Cl. 183—51)

The invention relates generally to means for separating coal or like solid particles from air in which it is entrained, as in a pneumatic conveying system, and primarily seeks to provide a novel and improved means for accomplishing the separating function in an efficient manner assuring the collection of all such solid particles as are commercially desirable.

In its more detailed nature the invention resides in the provision of a conduit or duct through which the solid particle bearing air is caused to move by a suitable fan, said duct being considerably enlarged in the zone of separation for the purpose of materially slowing down the velocity of the solid particle bearing air to thereby enable separation of the heavier particles by gravitation; a hopper into which the separated particles fall; a deflector screen of relatively large mesh for deflecting and precipitating out of the air stream solid particles of medium size; a second screen of relatively fine mesh for separating from the air stream the finest of solid particles which it is desired to collect; a novel outlet valve for controlling delivery from the hopper of the collected solid particles; and means for conveying the material delivered from said hopper.

Another object of the invention is to provide a novel mounting for the deflector screen which serves constantly to keep the screen clean and prevent clogging.

Another object of the invention is to provide a novel rotary screen of relatively fine mesh to efficiently remove from said stream and precipitate into the receiving hopper solid particles very small in size. This screen is disposed with its axis of rotation transversely of the air stream and by this means it is self cleaning in nature in that any dust which tends to clog the interstices of the screen portion presented to the solid particle bearing air stream at a given time will be removed by the screened air passing through that same or previously clogged portion as it is rotated and presented toward the outlet end of the screened air bearing duct. A rotary brush contacts the periphery of the rotary screen and facilitates the keeping of the interstices thereof free of solid particles.

Another object of the invention is to provide novel means including a novel discharge valve for preventing air and dust leakage and yet providing for the desired discharge of the collected solid particles from the hopper onto the take off conveyor.

With these and other objects in view which will more fully appear, the nature of the invention will be more clearly understood by following the description, the appended claims, and the several views illustrated in the accompanying drawings.

In the drawings:

Figure 1 is a side elevation illustrating the invention, parts being broken away and in section.

Figure 2 is a horizontal section taken through the axis of the air duct.

Figure 3 is a vertical longitudinal section taken through the axis of the air duct.

Figure 4 is a vertical cross section taken on the line 4—4 on Figure 3.

Figure 5 is a vertical cross section taken on the line 5—5 on Figure 3.

Figure 6 is a detail cross section of one of the air leakage stop strips.

Figure 7 is a detail perspective view of the valve cage.

Figure 8 is a detail perspective view of the valve rotor.

Figures 9 and 10 are detail vertical cross sections illustrating the valve in closed and open positions respectively.

Figure 11 is a detail view illustrating the deflector screen mounting.

Like reference numerals designate corresponding parts throughout the several figures of the drawings.

In this particular disclosure, we have referred to our improved apparatus as adapted for separating coal particles from the air stream in which it is conveyed or entrained but it is to be understood that the invention is adaptable for use in connection with apparatus for pneumatically conveying other solids such as grain, sawdust, or the like.

In the drawings, 5 designates a duct or pipe line which includes an inlet end which is adapted to be applied to the coal pile or other supply for the purpose of entraining the coal particles in the air stream induced in said duct, and an outlet or discharge end from which the air stream is discharged after all commercially useful solid particles have been separated therefrom.

The duct includes or has connected therewith a separator housing generally designated 6 and which is supported upon a suitable frame 7. The housing 6 includes an entrant throatway 8 which is considerably enlarged and communicates into a separator chamber 9 from which depends a solid particle collecting hopper 10.

Beyond the separator chamber 9 the duct is continued in the form of a discharge extension 11 which is disposed in longitudinal alinement with the throatway 8 and delivers into a restricted outlet throat 12. The outlet throat 12 communicates with a fan housing 13 in which is rotatably mounted a suitable fan 14. In this disclosure the fan, being located at the discharge end of the duct, is in the nature of a suction fan but it is to be understood that any broad equivalent of the fan capable of inducing the necessary flow of solid particle bearing air through the duct may be employed.

Rotation is imparted to the fan through the medium of power transmitting devices 15 and the motor 16, the discharge from the fan being indicated at 17.

At its lower end the hopper 10 is provided with a discharge throat 18 and a valve cage 19 is secured to the hopper in position for receiving the solid particles delivered therefrom. The valve cage is shown in detail in Figures 7, 9, and 10 and is in the nature of an open-ended cylinder having end flanges 20 and suitable end closure caps 21, said flanges and caps being secured together and to the hopper in any suitable manner as indicated at 22 in Figure 4 of the drawings. Suitable gaskets 23 are interposed between the cage flanges and the side walls of the hopper so as to render the connection air tight.

The cage is provided with a longitudinal opening 24 registering with the discharge throat 18 of the hopper so as to receive the solid particles delivered therethrough and it also includes a similar discharge opening 25 disposed in spaced relation to the first mentioned opening or diametrically opposite as illustrated in Figures 7, 9 and 10.

Intermediate the receiving and discharge openings 24 and 25 the cage is provided with one or more intermediate openings 26 for removably receiving felt packer strips 27 carried by reinforce ribs 28 and removably secured in position on the cage by spring clips 29 as shown in Figures 9 and 10. The strips 27 tightly engage the periphery of the cylindrical valve 30 which is rotatably supported in the cage and equipped with a single longitudinal receiving and discharging opening 31 adapted to alternately register with the openings 24 and 25 of the valve cage as shown in Figures 9 and 10. Through the medium of this valve, operating as shown in Figures 9 and 10, it is possible to discharge collected solid particles from the hopper without permitting undesirable ingress or egress of air or dust. The valve thus operates in the nature of an air lock.

In addition to the air sealing means heretofore referred to, the ends of the rotary valve 30 engage gaskets 33 interposed between said ends and the cage closure caps 21. The rotary valve includes a driving shaft 34 the ends of which extend through bearings provided therefor in the closure caps 21 and respectively carry a driven sprocket 35 and a driver sprocket 36.

A driving motor 37 is suitably supported upon the framing and a driver worm 38 is affixed to the shaft thereof and meshes with a worm wheel 39 secured to the jack shaft 40 rotatably supported on the framing, as illustrated in Figures 1, 2 and 3 of the drawings. A driver sprocket 41 is secured upon one end of the jack shaft and a chain 42 which engages this sprocket and the sprocket 35 carried by the valve shaft and serves to impart rotation to the valve.

If desired the solid particles delivered from the hopper through the rotary valve may be deposited directly into receiving bins or cars or they may be deposited onto a take off conveyor 43 for in- direct transfer to cars or bins as diagrammatically illustrated in Figures 1 and 3 of the drawings.

Within the enlarged separator chamber 9 a deflector or baffle screen 44 is mounted. This screen is preferably formed of phosphor-bronze and is of relatively large mesh, say of 50 meshes to the linear inch. It is pivotally or swingably supported at the top of the housing as at 45 so as to be constantly agitated by contact of the air stream and the solid particles entrained therein. In order to facilitate the yieldable mounting of the screen, springs 46 may be secured to the frame and to the top of the housing, as illustrated in Figure 11 of the drawings.

By thus mounting the baffle screen 44, it is constantly agitated and this agitation imparts to the screen a self cleaning characteristic insuring against clogging. The air stream entering the enlargement at 8 and 9 has its velocity materially reduced causing the solid particles entrained in the air stream to precipitate or fall by gravity into the hopper 10. The swinging baffle screen 44 assures the deflection and precipitation of the largest of the particles entrained in the air but the medium size and smaller particles may pass through this screen.

A rotary cylindrical screen 47 of very fine mesh, say 250 meshes to the linear inch, is disposed transversely of the duct above and at the outlet from the hopper 10. This screen includes the cylindrical periphery of screen cloth and a pair of end heads 48 connected by a driving shaft 49 rotatably supported in suitable bearings 50 provided therefor in the separator housing, as shown in Figures 2 and 5 of the drawings. The shaft carries a driven sprocket 51 at one end and a driver sprocket 52 at its other end.

To facilitate the mounting and replacement of the screen cloth, a longitudinal frame-piece 53 connects the heads 48 and includes a dovetail groove 54 for removably receiving the ends of the screen cloth and a suitable securing key 55.

A rotary brush 56 is disposed in the separator housing in engagement with the periphery of the screen 47 and includes a driver shaft 57, the ends of which extend through suitable bearings 58 provided therefor in the separator housing, one said end being equipped with a driver sprocket 59. Rotation is imparted to the brush by a transmission chain 60 which passes over the brush sprocket 59 and the driver sprocket 52 carried by the screen shaft 49. Rotation is imparted to the screen shaft 49 by a transmission chain 61 which engages the driver and driven sprockets 36 and 51 of the valve and screen shafts respectively.

Longitudinal packer strips 62 engage the periphery of the rotary screen 47 and prevent free passage of the air stream about said screen and cause all of said air to pass through said screen. The packer strips are carried by reinforcing strips 63 and are removably held in the mounting openings provided therefor in the separator housing by spring clips 64. See Figures 3 and 6.

The medium and small solid particles entrained in the air stream and which are not deflected and precipitated by the baffle screen 44 are separated from the air stream and caused to fall into the receiving hopper 10 by the rotary screen 47, the brush serving constantly to clean the surface of the rotary screen and throw off such solid particles as tend to adhere thereto.

It will be obvious by reference to Figure 3 of the drawings that any solid particles which tend to clog the interstices of the slowly rotating screen will be removed from said clogged portions as said portions are presented toward the discharge end of the duct. Thus the slowly rotating screen is self cleaning in nature and although the brush facilitates the cleaning function it can be eliminated from the apparatus without fear of the rotary screen becoming clogged.

It is of course to be understood that the details of structure and arrangement of parts may be variously changed and modified without departing from the spirit and scope of our invention.

We claim:

1. In apparatus of the character described, the combination of an air duct having an inlet and an outlet and an air velocity reducing enlargement intermediate said inlet and outlet, means for inducing a flow of solid particle bearing air through the duct, a solid particle collecting hopper associated with said enlargement, a first contacted baffle screen of relatively large mesh swingably supported in the duct traversing said enlargement, and a second contacted rotary cylindrical screen of relatively small mesh traversing said duct in said enlargement.

2. In apparatus of the character described, a horizontally disposed air duct having an inlet and an outlet and an intermediate depending solid particle collecting hopper providing an air velocity reducing enlargement, a baffle screen traversing the duct and extending angularly downward in said enlargement, means for swingably mounting the baffle screen to permit agitation thereof by the contacting air and solid particle contact, a rotary screen traversing the duct beyond the enlargement and having a portion of its periphery projecting into said enlargement, and a rotary brush mounted in said enlargement and contacting the projecting periphery of said rotary screen.

CHARLES R. STAHL.
JESSE L. KNIGHT.